M. D. SELF & J. O. WILLINGHAM.
PUNCTURE DETECTOR FOR INNER TUBES FOR TIRES.
APPLICATION FILED JULY 30, 1914.

1,148,933.

Patented Aug. 3, 1915.

Inventor
Major D. Self
Joseph O. Willingham

UNITED STATES PATENT OFFICE.

MAJOR DOUGLAS SELF, OF BESSEMER, AND JOSEPH OLIVER WILLINGHAM, OF BRIGHTON, ALABAMA.

PUNCTURE-DETECTOR FOR INNER TUBES FOR TIRES.

1,148,933. Specification of Letters Patent. Patented Aug. 3, 1915.

Application filed July 30, 1914. Serial No. 854,197.

*To all whom it may concern:*

Be it known that we, MAJOR DOUGLAS SELF and JOSEPH OLIVER WILLINGHAM, citizens of the United States of America, residing at Bessemer and Brighton, respectively, in the county of Jefferson and State of Alabama, have invented certain new and useful Improvements in Puncture-Detectors for Inner Tubes for Tires, of which the following is a specification.

Our invention relates to an improvement in a device for locating the punctures or leaks in inner tubes of automobile tires, and our object is to provide a simple and inexpensive device adapted both for testing the leakage of valve and locating punctures in the tube.

One object of our invention is to design a puncture detector of such character that it encompasses practically the whole part of the tube liable to puncture so that by passing the tube through it once, all punctures through the tire tread or from rim cutting can be located at the same time.

A further advantage of having our detector practically encompass the tube is that by inflating the latter it is expanded into air tight engagement with the inner walls of the detector which are recessed to form a chamber which communicates with an indicator that responds to an increase of pressure in the chamber due to the leakage of air therein through the puncture. By our arrangement the tube is inserted in partially expanded condition into the detector, and drawn therethrough, requiring but small time for the operation.

Our invention further comprises the details of construction and arrangement of parts which are hereinafter more particularly described and claimed and which are illustrated in their preferred embodiment only in the accompanying drawings, in which:—

Figure 1:
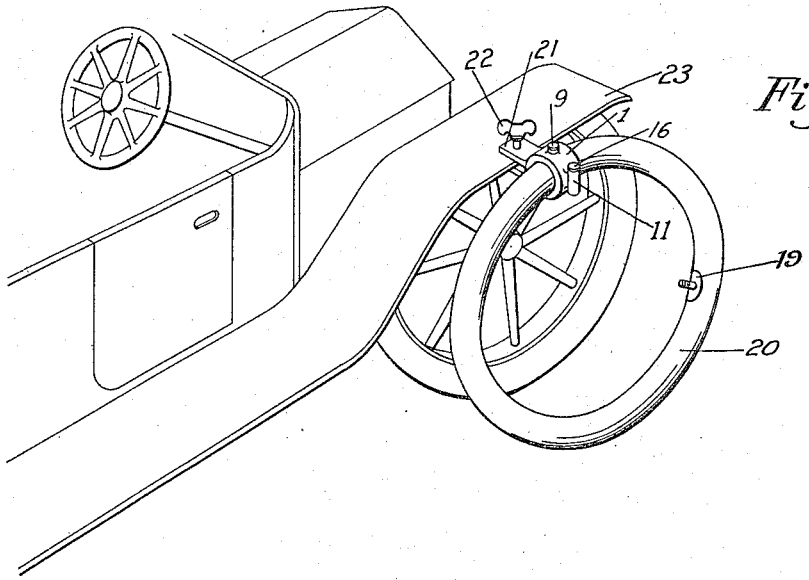
Figure 2:
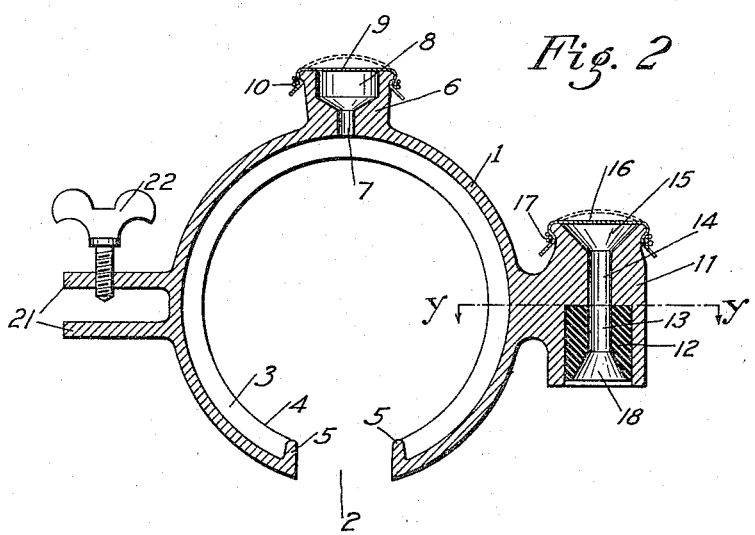
Figure 3:
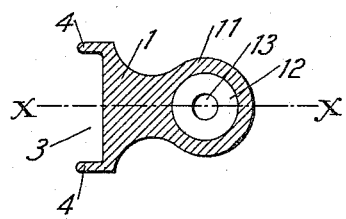

Figure 1 is a perspective view of our device in operation. Fig. 2 is a vertical central sectional view through the device taken on a plane corresponding to that of the line x—x of Fig. 3. Fig. 3 is a cross sectional view on the line y—y of Fig. 2.

Similar reference numerals refer to similar parts throughout the drawings.

Our invention, as disclosed in the drawings, comprises a metallic body portion 1 which is ring-shaped except where interrupted by a slot 2 which is made sufficiently wide to permit an inner tube to be pinched together and inserted therethrough into the ring. The inner wall of the detector is recessed to form a chamber 3 having side walls 4 and end walls 5 adjacent to the slot 2. This chamber 3 is continuous from the wall 5 on one side of the slot to the wall 5 on the other side of the slot and is preferably of uniform depth. The body 1 has cast or attached thereto a boss 6 through which a port 7 leads into the chamber 3. The port 7 opens into an enlarged chamber 8 in the boss which is open at its outer end and is normally closed by a thin rubber sheet 9 that is held stretched over the boss by a cord or rubber band 10 which secures its edges about the sides of the boss, causing the rubber sheet to form an air tight closure for the chamber 8.

One side of the body 1 has attached thereto or integral therewith an extension 11 having its greatest length in the plane of the ring body and provided at its lower end with an open bottom chamber which receives a rubber gasket 12. This gasket has a central opening 13 therethrough which registers with a passageway 14 that extends upwardly through the extension and opens into a flaring chamber 15 which is normally closed by a rubber sheet 16 similar to 9 and held in place by a string, band, or retainer means 17. The passage 13 through the gasket is also made flaring at its lower end 18 and is adapted to receive the valve stem 19 of an inner tube 20. Diametrically opposite the extension 11 the ring body is provided with lugs 21 which serve in conjunction with the thumb screw 22 to form a clamp by means of which the detector may be attached to any suitable support, such for instance as the mud guard 23 of the car. It will be noted that the edges of the side walls 4 for the chamber 3 are rounded (see Fig. 3) so that they will not injure the inner tube as it is drawn therethrough.

In practice, when the inner tube is found to be leaking, we first test the valve by forcing its outer end tightly into the rubber gasket 12. If there is leakage the rubber cover 16 will be forced outwardly by the air pressure to its dotted line position and will indicate clearly that there is trouble with the valve. In case leakage is not found in the valve and it becomes necessary to test the tube itself for the leak or puncture, the tube is partially expanded and by being pinched together is passed up through the opening 2 into the detector and permitted to expand until its walls press tightly against the side walls 4 and end walls 5 of the chamber 3, thereby making the chamber practically air tight. The detector being attached by its clamp to a support (or it may be held in hand if desired), the inner tube is now grasped and drawn slowly through the detector. Whenever the punctured or leaking portion of the tube comes into communication with the chamber 3, the escaping air pressure will instantly take effect causing a rise in pressure which is communicated through the port 7 to the chamber 8 and serves to force outwardly the rubber cover 9 as an indicator. It will be obvious that a tube can be drawn quickly through the detector and that it will in one operation cover all but the very small portion of the inner wall of the tube where punctures practically never occur. However, if desired, the tube can be turned and passed again through the detector so that every part of it is brought into communication with the chamber 3. The clamp is desirable but not essential.

While we regard the rubber sheet shown as the simplest type of indicator for the detector, it will be obvious that other devices may be used to indicate an increased pressure within the detector.

Without limiting ourselves to the details of construction shown, what we claim as new and desire to secure by Letters Patent, is:—

1. As an article of manufacture, a detector for the leakage of inner tubes for tires comprising a tube puncture detector having a ring-like member adapted to encircle a section of the tire and provided with a circumferential groove on its inner face and pressure indicating means in communication with said groove, and a projection extending from the ring-like member at one side and provided with an opening extending therethrough, said opening being enlarged at one end to receive the end of a tire valve stem, a packing seated in said enlarged end of the opening to pack the joint between the stem and opening wall, said projection having a chamber into which the other end of the opening therein communicates, and a flexible expansible indicator mounted over said chamber and adapted to indicate rises of pressure therein, substantially as described.

2. As an article of manufacture, a detector for the leakage of air from inner tubes of tires comprising a puncture detector for the tube body having a ring-like member adapted to encircle a section of the tire and being interrupted for the introduction of the tire into the ring-like member, said member being provided with a circumferential groove on its inner face, pressure indicating means in communication with said groove, a projection extending from the ring-like member at one side and provided with an opening adapted to receive a tire valve stem, and pressure indicating means in communication with said opening, substantially as described.

In testimony whereof we affix our signatures in presence of two witnesses.

MAJOR DOUGLAS SELF.
JOSEPH OLIVER WILLINGHAM.

Witnesses:
NOMIE WELSH,
J. W. COX.

Copies of this patent may be obtained for five cents each, by addressing the "Commissioner of Patents, Washington, D. C."